(12) United States Patent
Imai (10) Patent No.: US 7,793,016 B2
(45) Date of Patent: Sep. 7, 2010

(54) INFORMATION PROCESSING APPARATUS, ITS CONTROL METHOD AND CONTROL PROGRAM

(75) Inventor: Takashi Imai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 10/780,621

(22) Filed: Feb. 19, 2004

(65) Prior Publication Data

US 2004/0230716 A1    Nov. 18, 2004

(30) Foreign Application Priority Data

Feb. 21, 2003  (JP)  ............... 2003-044486

(51) Int. Cl.
  *G06F 3/00*  (2006.01)
(52) U.S. Cl. .................................... 710/62
(58) Field of Classification Search ............ 710/1, 710/62, 74, 313, 316; 700/94
  See application file for complete search history.

(56) References Cited

U.S. PATENT DOCUMENTS

| | | | | |
|---|---|---|---|---|
| 5,784,581 | A * | 7/1998 | Hannah | 710/110 |
| 6,052,750 | A | 4/2000 | Lea | 710/72 |
| 6,421,069 | B1 | 7/2002 | Ludtke et al. | 715/762 |
| 6,549,958 | B1 * | 4/2003 | Kuba | 710/14 |
| 6,636,923 | B1 * | 10/2003 | Meirsman et al. | 710/305 |
| 6,732,218 | B2 * | 5/2004 | Overtoom et al. | 710/313 |
| 6,754,725 | B1 | 6/2004 | Wright et al. | 710/8 |
| 7,010,624 | B1 | 3/2006 | Zhou et al. | 710/8 |
| 7,152,190 | B2 * | 12/2006 | Overtoom | 714/44 |
| 2002/0029090 | A1 * | 3/2002 | Pierre Bertin et al. | 700/94 |
| 2002/0156947 | A1 | 10/2002 | Nishio | 710/36 |
| 2003/0023804 | A1 * | 1/2003 | Matsuda et al. | 710/313 |
| 2003/0172223 | A1 * | 9/2003 | Ying et al. | 710/316 |
| 2003/0175025 | A1 * | 9/2003 | Watanabe et al. | 396/155 |
| 2003/0236934 | A1 * | 12/2003 | Park | 710/74 |
| 2004/0153597 | A1 | 8/2004 | Kanai et al. | 710/305 |
| 2004/0212831 | A1 | 10/2004 | Imai et al. | 358/1.16 |
| 2004/0222982 | A1 | 11/2004 | Imai | 345/204 |

(Continued)

FOREIGN PATENT DOCUMENTS

JP  09-035026  2/1997

(Continued)

OTHER PUBLICATIONS

Philips, ISP1362—Single-chip Universal Serial Bus On-the-Go controller, Feb. 19, 2003, Rev.02, pp. 1-148.*

(Continued)

*Primary Examiner*—Tariq Hafiz
*Assistant Examiner*—Aurangzeb Hassan
(74) *Attorney, Agent, or Firm*—Fitzpatrick, Cella, Harper & Scinto (57) ABSTRACT

An information processing apparatus capable of communication with an external unit connected thereto. The apparatus has a connection unit to connect the external unit, a first control unit connectable to the external unit for controlling communication between the connected external unit and the information processing apparatus, a second control unit connectable to the external unit for controlling communication between the connected external unit and the information processing apparatus, and a switching unit to select the first control unit or the second control unit as a control unit connected to the external unit for communication between the connected external unit and the information processing apparatus.

9 Claims, 6 Drawing Sheets

U.S. PATENT DOCUMENTS

2004/0230716 A1 11/2004 Imai .......................... 710/15
2006/0059289 A1* 3/2006 Ng et al. .................... 710/305

FOREIGN PATENT DOCUMENTS

| JP | 09-305523 | 11/1997 |
|---|---|---|
| JP | 11-39152 | 2/1999 |
| JP | 2001-256167 | 9/2001 |
| JP | 2002-116853 | 4/2002 |
| JP | 2002-288112 | 10/2002 |
| JP | 2003-6133 | 1/2003 |

OTHER PUBLICATIONS

U.S. Appl. No. 10/784,261, filed Feb. 24, 2004, Imai, T.
U.S. Appl. No. 10/775,095, filed Feb. 11, 2004, Imaim T. Sugiyama, N. Takeda, T.

* cited by examiner

INFORMATION PROCESSING APPARATUS, ITS CONTROL METHOD AND CONTROL PROGRAM

FIELD OF THE INVENTION

The present invention relates to an information processing apparatus, its control method and a control program.

BACKGROUND OF THE INVENTION

An information processing apparatus, e.g., a printer or a printer-based multifunction product, connectable to a conventional external device such as a personal computer or a digital still camera, has only one connection terminal for connection with an external device.

In such a case where there is only one connection terminal, when the information processing apparatus is connected with, for example, a personal computer via the connection terminal, a digital camera cannot be connected to the information processing apparatus any more.

Recently, printers with plural connection terminals have been proposed. However, terminals are provided fixedly for external devices. For example, a terminal for connection with a personal computer is distinguished from a terminal for connection with a digital still camera. Thus there are problems of usability and operability.

Further, a connection method without distinction of connection terminal direction is proposed as a common standard (e.g., USB On-the-Go standard). Devices corresponding to this standard, however, have not been widely used. To promote widespread use of devices in conformity with this standard, it is necessary to install an expensive electric circuit for connection with various external devices, and complicated control software for control of the external devices, into the information processing apparatus.

SUMMARY OF THE INVENTION

As described above, the operability and functionality upon connection between the information processing apparatus and external devices such as a personal computer and a digital still camera are susceptible to improvement. Accordingly, the present invention readily improves the operability and functionality upon connection between the information processing apparatus and external devices such as a personal computer and a digital still camera.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1A:
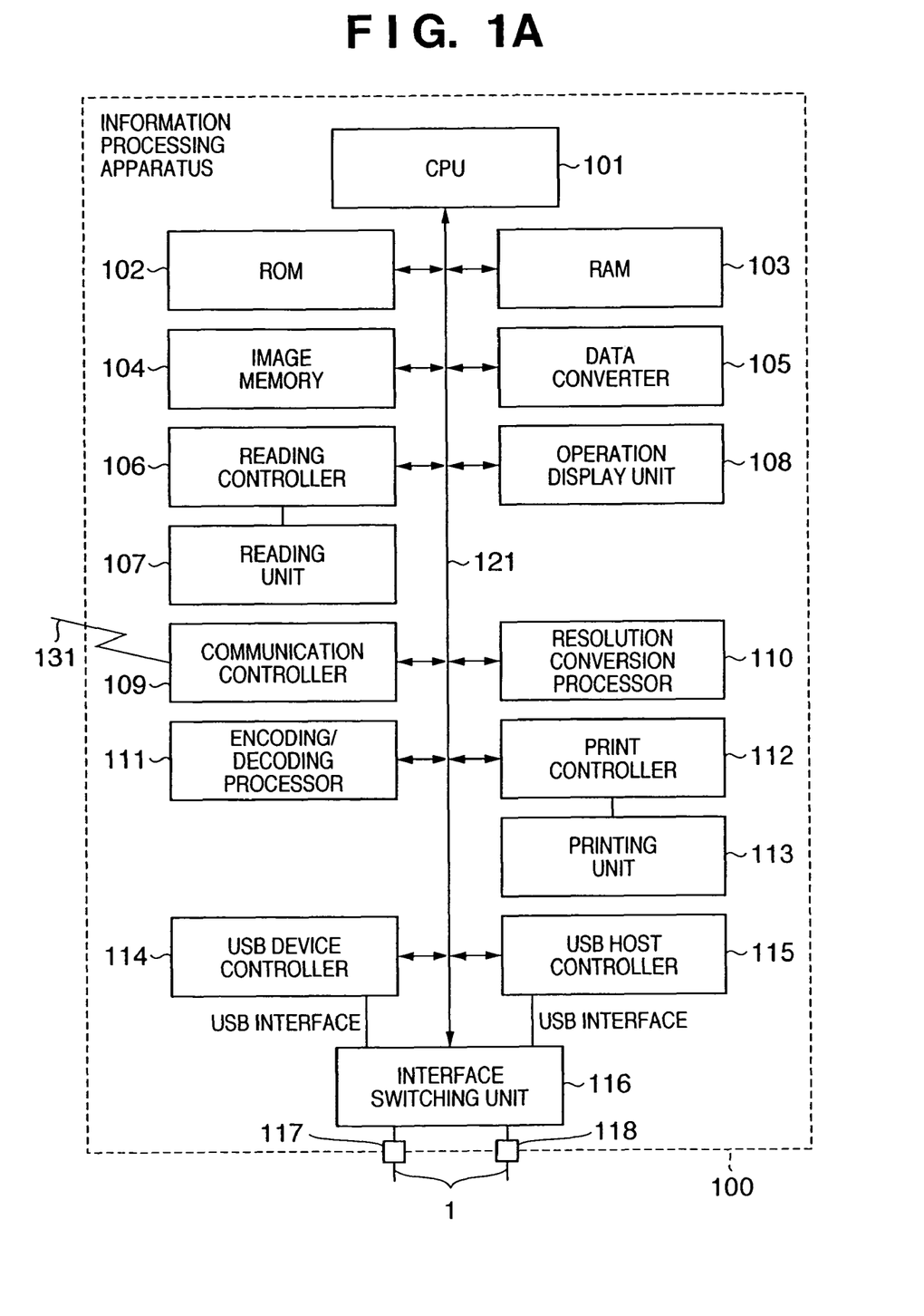
FIG. 1A is a block diagram showing an example of construction of an information processing apparatus according to an embodiment of the present invention.

First, an information processing apparatus 100 will be described in detail. FIG. 1A is a block diagram showing a schematic construction of the information processing apparatus 100 according to an embodiment of the present invention. In the information processing apparatus 100, a CPU 101 is a system controller which controls the overall information processing apparatus 100.

A ROM 102 holds fixed data such as control programs executed by the CPU 101, a data table and an operating system (OS) program. In the present embodiment, the various control programs stored in the ROM 102 perform software execution control such as scheduling, task switching and interruption processing under the control of the OS stored in the ROM 102, to realize a multitask function for print control, reading control, communication control and the like.

A RAM 103 comprises, for example, a SRAM (Static Random Access Memory) requiring a backup power source. Data is held on the RAM 103 with a primary battery (not shown) for data backup. The RAM 103 holds program control variables and the like which must not be deleted. Further, the RAM 103 has a memory area for storing operator-registered values and management data for the information processing apparatus 100.

An image memory 104 comprises, for example, a DRAM (Dynamic Random Access Memory). The image memory 104 mainly holds image data handled by the information processing apparatus 100, print data to be transmitted to a printing unit 113 (to be described in detail later), status information obtained by the printing unit 113 and the like. Further, a part of the image memory 104 can be ensured as a work area for execution of software processing.

A data converter 105 performs interpretation of PDL (Page Description Language) or the like, and performs image data conversion such as CG (Computer Graphics) mapping of character data.

In a reading controller 106, a reading unit 107 optically reads an original document with a CIS image sensor (contact image sensor), then an image signal, converted as electric image data, is subjected to various image processings such as binarization and halftone processing via an image processing controller (not shown) of the reading controller 106, and high-precision image data is outputted. It should be noted that in the present embodiment, the reading controller 106 and the reading unit 107 are available for sheet reading control for reading with a fixed CIS image sensor while conveying an original, and also available for book reading control for scanning an original fixed on a platen with a moving CIS image sensor. The image sensor in the reading unit 107 may be CCD image sensor.

An operation display unit 108 has an operation unit with various keys, such as numeral value input keys, character input keys, single-touch telephone number keys, a mode setting key, a determination key, cancellation key and the like, for determination of image-transmission destination data and registration of preset data, an LED (light emitting diode) and an LCD (liquid crystal display) and the like. The operator's various input operations, display of operation status of the information processing apparatus 100 and the like are made at the operation display unit 108. Further, when a warning is made to the operator, the LED flashes and warning information is displayed in the LCD.

A communication controller 109 comprises a MODEM, an NCU (Network Control Unit) and the like. In the present embodiment, the communication controller 109 is connected to an analog communication line (PSTN) 131 for line control in T-30 protocol communication, call origination and call in to the communication line.

A resolution conversion processor 110 performs resolution conversion control such as mutual image data conversion between milli-based image data and inch-based image data. Note that in the resolution conversion processor 110, image data enlargement/reduction (scaling) processing is also possible.

A coding/decoding processor 111 performs mutual coding/decoding or enlarging/reduction (scaling) on image data (non-compressed, MH, MR, MMR, JBIG, JPEG etc.) handled by the information processing apparatus 100.

A printing controller 112 performs various image processings, such as smoothing processing, printing-density correction processing and color correction, on image data to be print-outputted, via an image processing controller (not shown), thereby converts the image data to high-precision image data and outputs the data to the printing unit 113 (to be described in detail later). The printing unit 113 is a printing apparatus such as a laser beam printer or an ink-jet printer controlled by a specialized CPU (not shown), which performs printing on a printing medium based on color image data or monochrome image data received from the printing controller 112. Further, an EEPROM (Electrically Erasable and Programmable Read Only Memory) (not shown) not requiring a backup power source is connected in the printing controller 112 for storing printing control parameters and the like.

A USB device controller 114, including a USB analog transceiver and a serial interface engine, performs communication control on USB interface. The USB device controller 114 performs protocol control in accordance with USB communication standards, converts data from a USB device control task executed by the CPU 101 into a packet and performs USB packet transmission to an external USB host unit (not shown) connected to the apparatus 100, on the other hand, converts a USB packet from an external USB host unit (not shown) connected to the apparatus 100 into data and transmits the data to the CPU 101. In this manner, the USB device controller 114 realizes communication between the information processing apparatus 100 and an external USB host unit. The USB communication standards allow high-speed bidirectional data communication by 1 host (master) connected with plural devices (slaves). The USB device controller 114 has a device function in USB communication.

A USB host controller 115, including a USB analog transceiver and a serial interface engine, performs communication control on USB interface. The USB host controller 115 performs protocol control in accordance with the USB communication standards, converts data from a USB host control task executed by the CPU 101 into a packet and performs USB packet transmission to an external USB device unit (not shown) connected to the apparatus 100, on the other hand, converts a USB packet from an external USB device unit (not shown) connected to the apparatus 100 into data and transmits the data to the CPU 101. In this manner, the USB host controller 115 realizes communication between the information processing apparatus 100 and an external USB device unit. The USB communication standards allow high-speed bidirectional data communication by 1 host (master) connected with plural devices (slaves). The USB host controller 115 has a host function in USB communication.

An interface switching unit 116 determines whether an external USB unit, connected to a USB connector 117 (to be described in detail later) or USB connector 118 (to be described in detail later), is a USB host unit or a USB device unit. The CPU 101 detects the result of determination and outputs a selection signal. The external USB device is connected to the USB device controller 114 or the USB host controller 115 based on the selection signal from the CPU 101.

The USB connector 117 is a connector in conformity with the USB communication standards. It is an AB type connector which can be connected to an external USB host unit such as a personal computer, and can also be connected to an external USB device unit such as a digital still camera.

The USB connector 118 is a connector similar to the USB connector 117 in conformity with the USB communication standards. It is an AB type connector which can be connected to an external USB host unit such as a personal computer, and can also be connected to an external USB device unit such as a digital still camera.

The above constituent elements 101 to 106, 108 to 112, and 114 to 116 are interconnected via a CPU bus 121 under the control of the CPU 101.

Figure 1B:
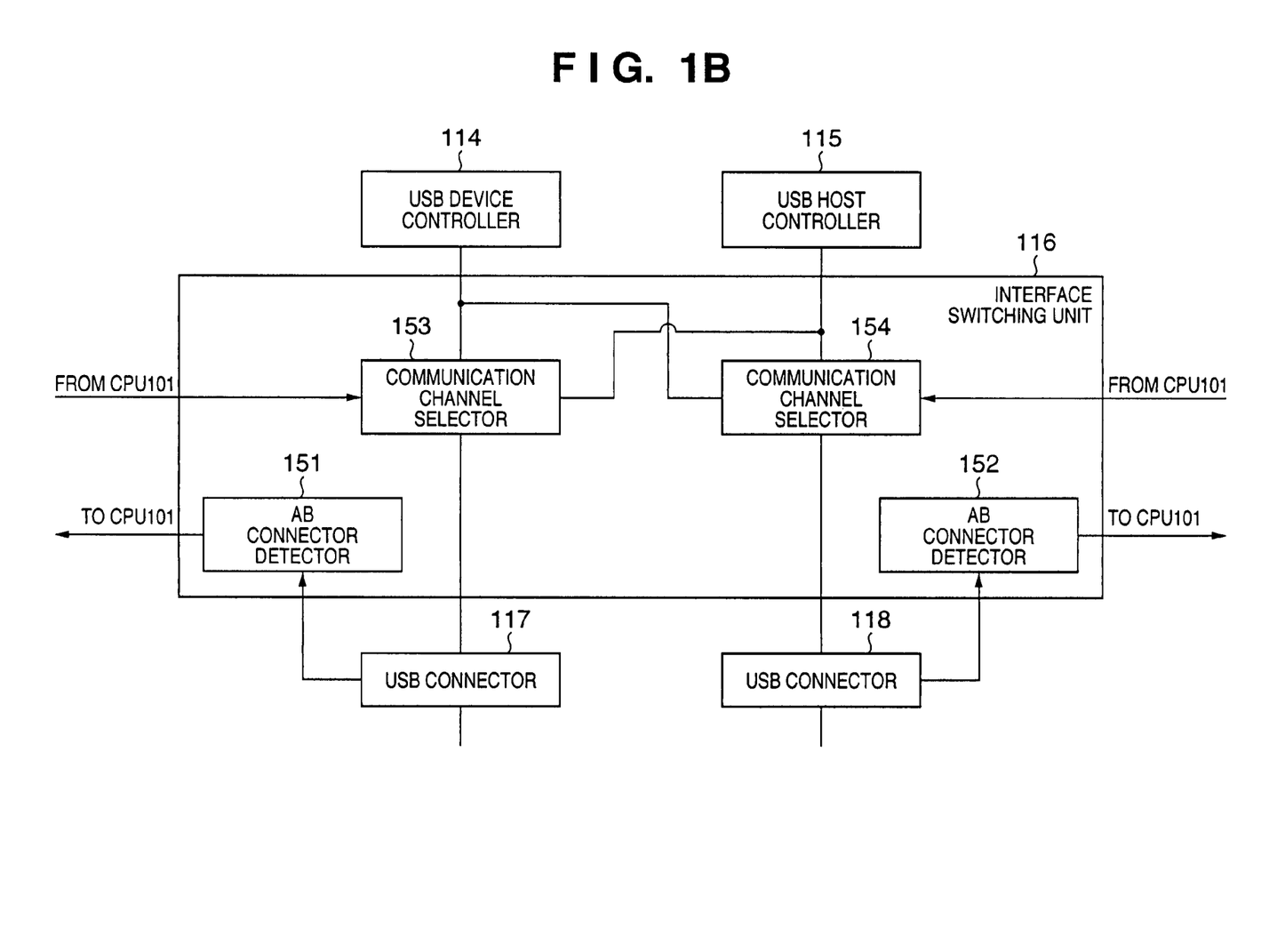
FIG. 1B is a block diagram showing an example of construction of an interface switching unit 116 according to the embodiment of the present invention.

Next, an example of construction of the interface switching unit 116 according to the present embodiment will be described in detail with reference to FIG. 1B. FIG. 1B is a block diagram showing an example of construction of the interface switching unit 116 in detail.

An AB connector detector 151, connected to the USB connector 117, determines whether a USB connector connected to the USB connector 117 is an A type connector or a B type connector. If the USB connector connected to the USB connector 117 is an A type connector, the CPU 101 determines that an external unit connected to the information processing apparatus 100 is a USB device unit. Further, if that the USB connector connected to the USB connector 117 is a B type connector, the CPU 101 determines that the external unit connected to the information processing apparatus 100 is a USB host unit. The result of determination by the AB connector detector 151 is notified to the CPU 101 via a control line.

An AB connector detector 152, connected to the USB connector 118, determines whether a USB connector connected to the USB connector 118 is an A type connector or a B type connector. If the USB connector connected to the USB connector 118 is an A type connector, the CPU 101 determines that an external unit connected to the information processing apparatus 100 is a USB device unit. Further, if that the USB connector connected to the USB connector 118 is a B type connector, the CPU 101 determines that the external unit connected to the information processing apparatus 100 is a USB host unit. The result of determination by the AB connector detector 152 is notified to the CPU 101 via a control line.

A communication channel selector 153 connects the USB connector 117 with the USB device controller 114 or with the USB host controller 115 based on a selection signal from the CPU 101. If the CPU 101 determines based on the notification from the AB connector detector 151 that a USB device unit has been connected to the USB connector 117, the CPU issues a selection signal to the communication channel selector 153 so as to connect the USB connector 117 to the USB host controller 115. On the other hand, if the CPU 101 determines based on the notification from the AB connector detector 151 that a USB host unit has been connected to the USB connector 117, the CUP issues a selection signal to the communication channel selector 153 so as to connect the USB connector 117 to the USB device controller 114.

A communication channel selector 154 connects the USB connector 118 with the USB device controller 114 or with the USB host controller 115 based on a selection signal from the CPU 101. If the CPU 101 determines based on the notification from the AB connector detector 152 that a USB device unit has been connected to the USB connector 118, the CPU issues a selection signal to the communication channel selector 154 so as to connect the USB connector 118 to the USB host controller 115. On the other hand, if the CPU 101 determines based on the notification from the AB connector detector 151 that a USB host unit has been connected to the USB connector 118, the CPU issues a selection signal to the communication channel selector 154 so as to connect the USB connector 118 to the USB device controller 114.

In this manner, the AB connector detectors 151 and 152 detect the type of unit connected to the USB connectors 117 and 118, and in accordance with the detected type of unit, the connectors are connected to the USB device controller 114 or the USB host controller 115 by the communication channel selectors 153 and 154.

The construction of the interface switching unit 116 may be realized as hardware switch having a mechanical structure or an electric hardware switch, otherwise, the interface selector may be realized as the result of software data communication.

Next, a control flow in a case where a personal computer is connected to the information processing apparatus 100 and printing is performed will be described in detail.

Figure 2:
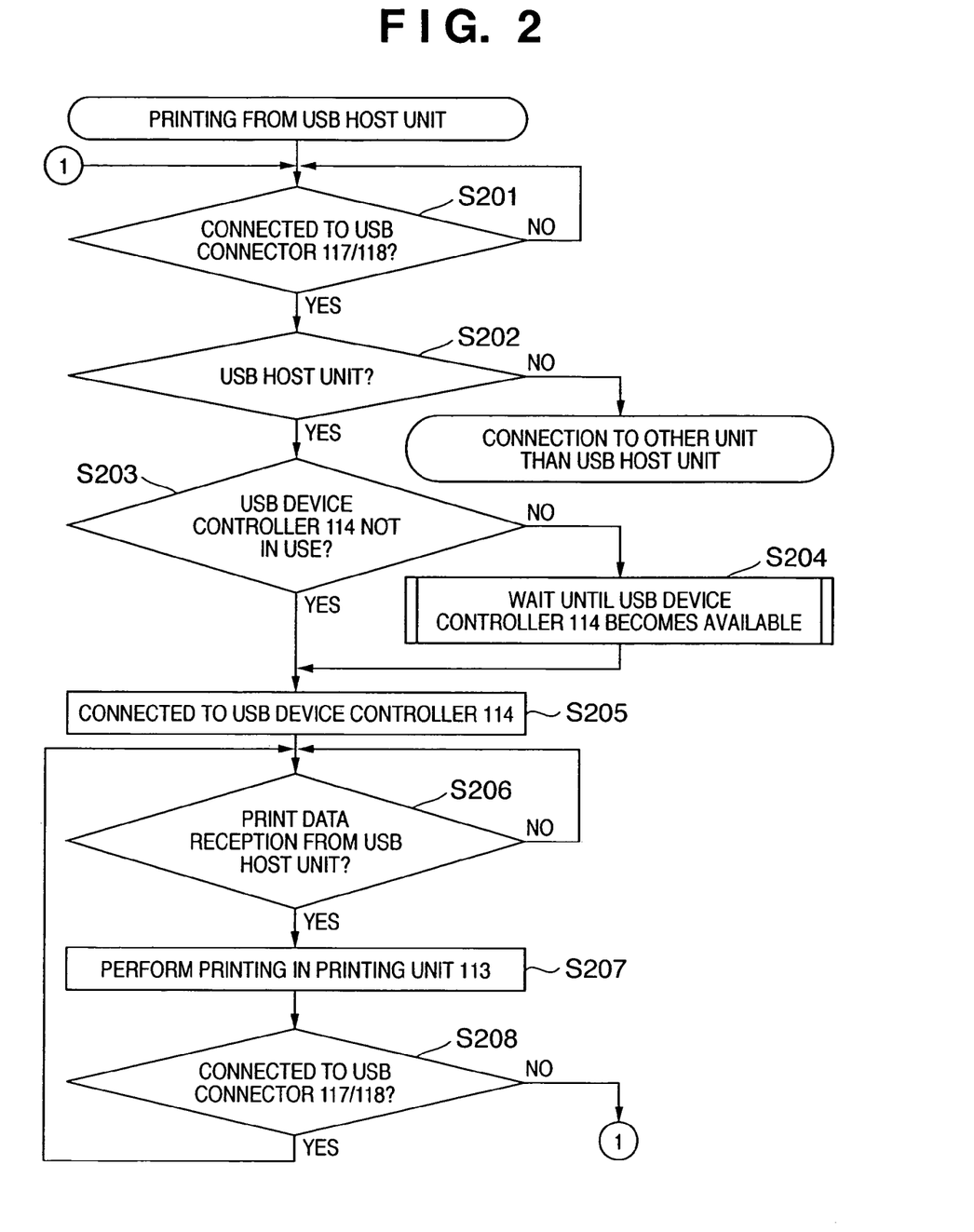
FIG. 2 is a flowchart showing an example of processing in a case where a USB host unit is connected to an information processing apparatus 100, according to the embodiment of the present invention.

FIG. 2 is a flowchart showing a control flow in a case where a USB host unit such as a personal computer is connected to the information processing apparatus 100 and printing is performed. Note that a description will be made on the assumption that the entire information processing apparatus 100 has been initialized by the CPU 101 prior to execution of the present flowchart and the information processing apparatus 100 is in a standby status waiting for operation start.

At step S201, the CPU 101 detects whether or not an external unit (i.e., a personal computer (not shown) in this example), has been connected to the USB connector 117 or the USB connector 118, via the interface switching unit 116.

If the CPU 101 determines at step S201 via the interface switching unit 116 that an external unit (personal computer) has been connected, the process flow proceeds to step S202. On the other hand, the CPU 101 does not detects connection of external unit via the interface switching unit 116, the process repeats step S201 thus monitors connection of external unit.

At step S202, the CPU 101 determines via the interface switching unit 116 whether or not the external unit connected to the USB connector 117 or the USB connector 118 is a USB host unit. Generally, a personal computer operates as a USB host unit. The determination as to whether or not the external unit is a USB host unit is made in correspondence with the type of connector notified from the interface switching unit 116 to the CPU 101. If the CPU 101 is notified that the USB connector of the external unit connected to the USB connector 117 or the USB connector 118 is the B type, it is determined that the external unit is a USB host unit. On the other hand, if the CPU 101 is notified that the USB connector of the external unit connected to the USB connector 117 or the USB connector 118 is the A type, it is determined that the external unit is a USB device unit.

Figure 3:
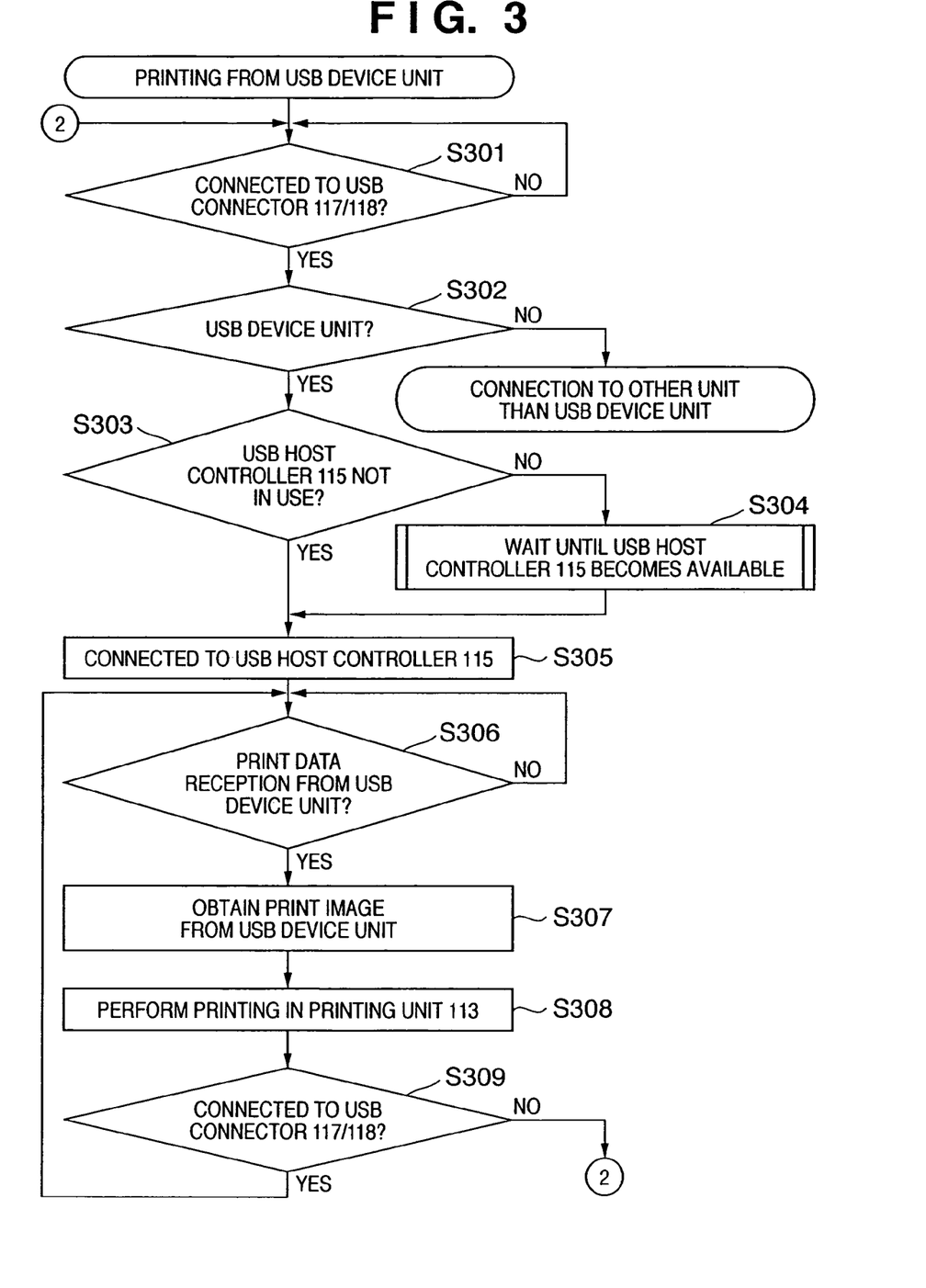
FIG. 3 is a flowchart showing an example of processing in a case where a USB device unit is connected to the information processing apparatus 100, according to the embodiment of the present invention.

If the CPU 101 determines at step S202 via the interface switching unit 116 that the external unit is a USB host unit, the process flow proceeds to step S203. On the other hand, if the CPU 101 determines at step S202 via the interface switching unit 116 that a USB device unit other than a USB host unit has been connected, the process flow proceeds to processing in a case where a USB device unit has been connected (FIG. 3, step S302).

At step S203, the CPU 101 determines whether or not the USB device controller 114 is in use. For example, in a case where printing is being performed based on data from another external unit (e.g., a personal computer other than the above-described personal computer), before completion of first printing process flow, the second printing process flow starts, and it is determined in the second printing process flow that the USB device controller 114 is in use. On the other hand, even when printing is being performed based on data from the other external unit, if the first printing process flow ends without start of second printing process flow, it is determined that the USB device controller 114 is not in use. In a case where printing based on data from another external unit is not being performed, it is also determined that the USB device controller 114 is not in use.

If the CPU 101 determines at step S203 that the USB device controller 114 is not in use, the process flow proceeds to step S205. On the other hand, if the CPU 101 determines that the USB device controller 114 is in use, the process flow proceeds to step S204. The details of processing at step S204 will be described with reference to FIG. 4.

At step S205, the CPU 101 connects the external unit connected to the USB connector 117 or the USB connector 118 to the USB device controller 114 via the interface switching unit 116. More specifically, the CPU 101 issues a selection signal to the communication channel selector 153 or 154 of the interface switching unit 116 so as to connect the USB connector 117 or the USB connector 118 to the USB device controller 114.

The external unit, the USB connector 117 or the USB connector 118, the interface switching unit 116 and the USB device controller 114 are interconnected respectively with USB interface in conformity with the USB communication standards. Accordingly, the external unit connected to the USB connector 117 or the USB connector 118 can be operative as if it is directly connected to the USB device controller 114.

At step S206, the CPU 101 comes in a status where reception of print data from the external unit connected to the USB connector 117 or the USB connector 118 is waited. When the CPU 101 receives print data from the external unit connected to the USB connector 117 or the USB connector 118 at step S206, the process flow proceeds to step S207. If the CPU 101 does not receive print data from the external unit connected to the USB connector 117 or the USB connector 118 at step S206, monitoring of reception of print data is continued at step S206.

At step S207, the CPU 101 print-outputs the print data received from the external unit at step S206 on a printing medium by controlling the printing controller 112.

At step S208, the CPU 101 detects via the interface switching unit 116 whether or not an external unit is connected to the USB connector 117 or the USB connector 118. The detection of connection is made as described above.

If the CPU 101 determines at step S208 via the interface switching unit 116 that an external unit is connected, the process flow proceeds to step S206. On the other hand, if the CPU 101 determines at step S208 via the interface switching unit 116 that an external unit, i.e., a personal computer (not shown) is not connected, the process flow returns to step S201, at which connection between an external unit and the USB connector 117 or the USB connector 118 is monitored.

Next, a control flow in a case where a USB device unit such as a digital still camera is connected to the information processing apparatus 100 and printing is performed will be described in detail.

FIG. 3 is a flowchart showing in detail a control flow in a case where a digital still camera is connected to the information processing apparatus 100 and printing is performed. Note that a description will be made on the assumption that the entire information processing apparatus 100 has been initialized by the CPU 101 prior to execution of the present flowchart and the information processing apparatus 100 is in a standby status waiting for operation start.

At step S301, the CPU 101 detects via the interface switching unit 116 whether or not an external unit (digital still camera (not shown)) has been connected to the USB connector 117 or the USB connector 118. The detection of connection is made as described above.

If the CPU 101 determines at step S301 via the interface switching unit 116 that an external unit has been connected, the process flow proceeds to step S302. On the other hand, if the CPU 101 determines at step S301 via the interface switching unit 116 that an external unit has not been connected, the process flow repeats step S301 again.

At step S302, the CPU 101 determines via the interface switching unit 116 whether or not the external unit connected to the USB connector 117 or the USB connector 118 is a USB device unit. Generally, a digital still camera operates as a USB device unit. The determination as to whether or not the external unit is a USB device unit is made in correspondence with the type of connector notified from the interface switching unit 116 to the CPU 101. If the CPU 101 is notified that the USB connector of the external unit connected to the USB connector 117 or the USB connector 118 is an A type connector, it is determined that the external unit is a USB device unit. On the other hand, If the CPU 101 is notified that the USB connector of the external unit connected to the USB connector 117 or the USB connector 118 is a B type connector, it is determined that the external unit is a USB host unit.

If the CPU 101 determines at step S302 via the interface switching unit 116 that the external unit is a USB device unit, the process flow proceeds to step S303. On the other hand, if the CPU 101 determines at step S302 via the interface switching unit 116 that the external unit is a USB host unit, the process flow proceeds to processing in the case of connection with a USB host unit (FIG. 2, step S202).

At step S303, the CPU 101 determines whether or not the USB host controller 115 is in use. For example, in a case where the external unit is connected when data from other external unit (e.g., a memory card reader (not shown)) than the above external unit is being read, it is determined that the USB host controller 115 is in use at step S303 of the printing processing flow for the digital still camera, which is the subject external unit. On the other hand, in a case where processing such as reading data from another external unit is not performed when the external unit is connected, it is determined that the USB host controller 115 is not in use at step S303 of the printing processing flow for the digital still camera, which is the subject external unit.

If the CPU 101 determines at step S303 that the USB host controller 115 is not in use, the process flow proceeds to step S305. On the other hand, if the CPU 101 determines at step S303 that the USB host controller 115 is in use, the process flow proceeds to step S304. The processing at step S304 will be described in detail later with reference to FIG. 5.

At step S305, the CPU 101 connects the external unit, connected to the USB connector 117 or the USB connector 118, to the USB host controller 115 via the interface switching unit 116. More particularly, the CPU 101 issues a selection signal to the communication channel selector 153 or 154 of the interface switching unit 116 so as to connect the USB connector 117 or the USB connector 118 to the USB host controller 115.

The external unit, the USB connector 117 or the USB connector 118, the interface switching unit 116 and the USB host controller 115 are interconnected respectively with USB interface in conformity with the USB communication standards. Accordingly, the external unit connected to the USB connector 117 or the USB connector 118 can be operative as if it is directly connected to the USB host controller 115.

At step S306, the CPU 101 comes in a status where reception of print data from the external unit connected to the USB connector 117 or the USB connector 118 is waited. When the CPU 101 receives print data from the external unit connected to the USB connector 117 or the USB connector 118 at step S306, the process flow proceeds to step S307. If the CPU 101 does not receive print data from the external unit connected to the USB connector 117 or the USB connector 118 at step S306, the process flow proceeds to step S306.

At step S307, the CPU 101 receives print data from the external unit connected to the USB connector 117 or the USB connector 118. The CPU 101 temporarily stores the print data received from the external unit into the image memory 104.

At step S308, the CPU 101 print-outputs the print data, received from the external unit and stored into the image memory 104 at step S307, onto a printing medium by controlling the coding/decoding processor 111 and the printing controller 112.

At step S309, the CPU 101 detects via the interface switching unit 116 whether or not an external unit is connected to the USB connector 117 or the USB connector 118. The detection of connection is made as described above.

If the CPU 101 determines at step S309 via the interface switching unit 116 that an external unit is connected, the process flow proceeds to step S306. On the other hand, if the CPU 101 determines at step S309 via the interface switching unit 116 that an external unit is not connected, the process flow returns to step S301.

Next, a control flow in a case where a personal computer is connected to the information processing apparatus 100 while another personal computer is already connected and printing is being performed will be described in detail.

Figure 4:
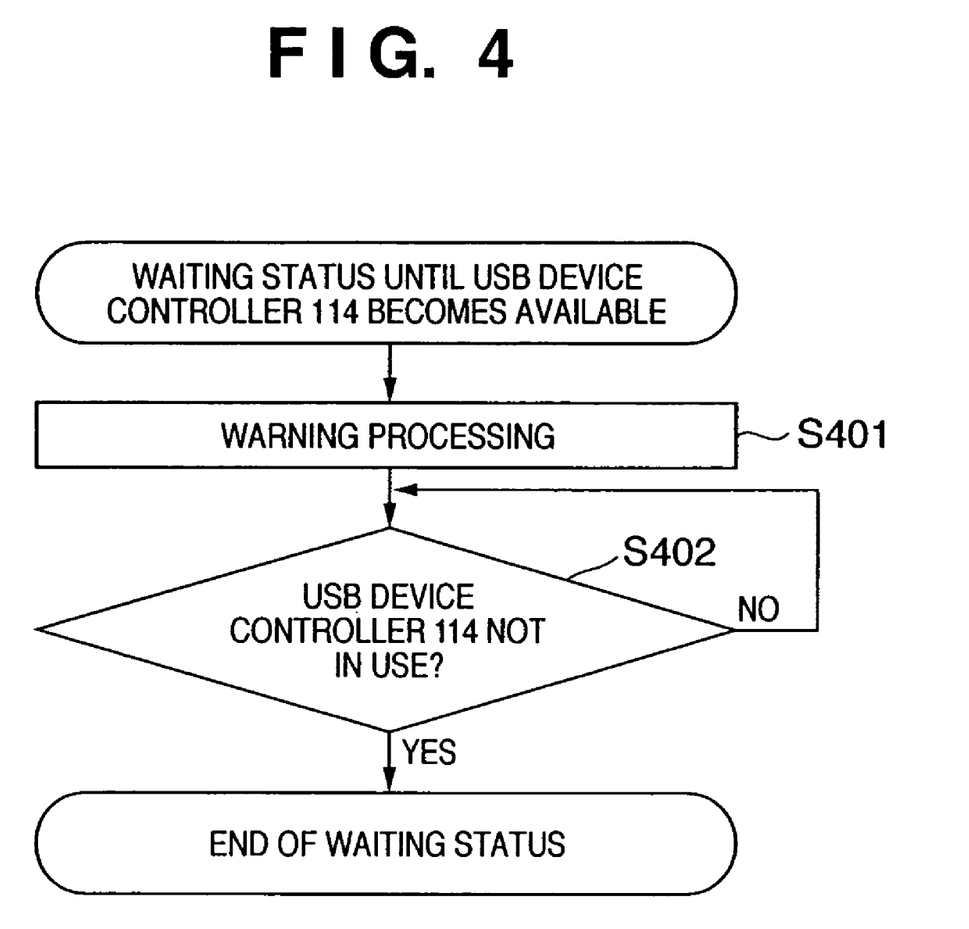
FIG. 4 is a flowchart showing an example of processing in a waiting status until a USB device controller becomes available, according to the embodiment of the present invention.

FIG. 4 is a flowchart showing in detail a control flow in a case where a personal computer is connected to the information processing apparatus 100 while another personal computer is already connected and printing is being performed.

At step S401, the CPU 101 performs warning processing. More particularly, the CPU 101 controls the operation display unit 108 to make warning display indicating that the USB device controller 114 is in use for the operator. Further, the CPU 101 controls the operation display unit 108 to flash an alarm LED for indicating that the USB device controller 114 is in use for the operator. Further, the CPU 101 controls the operation display unit 108 to emit an alarm sound indicating that the USB device controller 114 is in use for the operator.

At step S402, the CPU 101 determines whether or not the USB device controller 114 is in use. If the CPU 101 determines at step S402 that the USB device controller 114 is not in use, the process flow proceeds to step S205 in FIG. 2. On the other hand, if the CPU 101 determines at step S402 that the USB device controller 114 is in use, the process flow repeats step S402.

Next, a control flow in a case where an external unit (e.g., a memory card reader), is connected to the information processing apparatus 100 while a digital still camera is already connected and printing is being performed will be described in detail.

Figure 5:
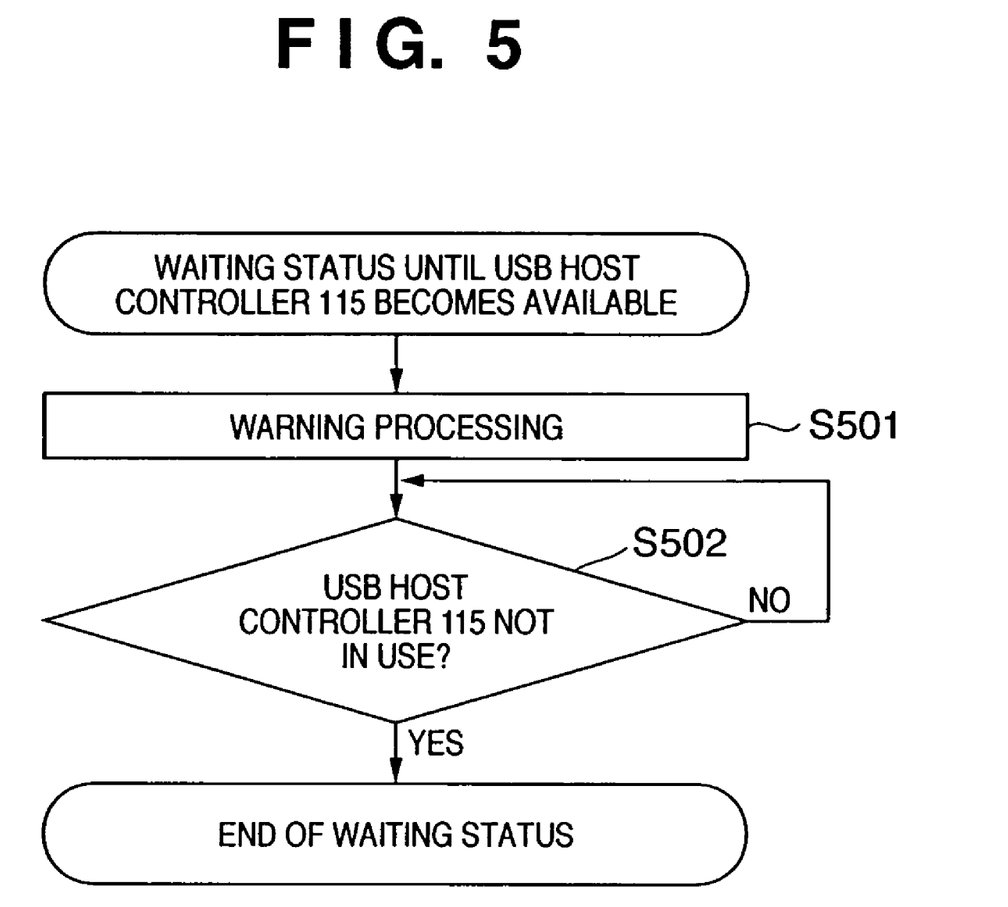
FIG. 5 is a flowchart showing an example of processing in a waiting status until a USB host controller becomes available, according to the embodiment of the present invention.

FIG. 5 is a flowchart showing in detail a control flow in a case where an external unit (e.g., a memory card reader), is connected to the information processing apparatus 100 while a digital still camera is already connected and printing is being performed.

At step S501, the CPU 101 controls the operation display unit 108 to make warning display indicating that the USB host controller 115 is in use for the operator. Further, the CPU 101 controls the operation display unit 108 to flash the alarm LED indicating that the USB host controller 115 is in use for the operator. Further, the CPU 101 controls the operation display unit 108 so as to emit an alarm sound indicating that the USB host controller 115 is in use for the operator.

At step S502, the CPU 101 determines whether or not the USB host controller 115 is in use. If the CPU 101 determines at step S502 that the USB host controller 115 is not in use, the process flow proceeds to step S305 in FIG. 3. On the other hand, if the CPU 101 determines at step S502 that the USB host controller 115 is in use, the process flow repeats step S502.

As described above, according to the present invention, an external host unit such as a personal computer and an external device unit such as a digital still camera can be simultaneously connected and simultaneously operated.

Further, when an operator connects an external host unit to the information processing apparatus 100, the operator can connect the external unit without paying attention to the connection terminal.

Further, when the operator connects an external device unit to the information processing apparatus 100, the operator can connect the external unit without paying attention to the connection terminal.

Further, in a case where the operator connects an external host unit to the information processing apparatus 100 while another external host unit is already connected, the operator receives a warning that external host units cannot be simultaneously used.

Further, when the operator has received the warning that external host units cannot be simultaneously used, the next external host unit can be automatically used without the operator's re-connection.

Further, in a case where the operator connects an external device unit such as a digital still camera while an external device unit such as a memory card reader is already connected to another connection terminal of the information processing apparatus 100, the operator receive a warning that external device units cannot be simultaneously used.

Further, when the operator have received the warning that external device units cannot be simultaneously used, the next external device unit can be automatically used without the operator's re-connection.

As described in detail above, according to the present invention, the operability and functionality upon connection between an information processing apparatus and external units such as a personal computer and a digital still camera can be easily improved.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus capable of communication with apparatuses connected thereto for information processing, comprising:
    a USB device controller connectable with a USB host apparatus, which always assumes a host role, for controlling communication between the connected USB host apparatus and the information processing apparatus;
    a USB host controller connectable with a USB device apparatus, which is different from the USB host apparatus, for controlling communication between the connected USB device apparatus and the information processing apparatus;
    a connection unit having a plurality of connectors, wherein each connecter is for the USB host apparatus and the USB device apparatus;
    a controller connected with each of a plurality of apparatuses through said USB device controller or said USB host controller; and
    a switching unit for switching a connection between each of the connectors and one of said USB device controller and said USB host controller,
    wherein said switching unit determines the type of the apparatus connected to the connector for each connector, and
        if it is determined that the apparatus connected to that connector is the USB device apparatus, connects the USB device apparatus with said USB host controller so that the information processing apparatus can communicate with the USB device apparatus through the USB host controller, and
        if it is determined that the apparatus connected to that connector is the USB host apparatus, connects the USB host apparatus with said USB device controller so that the information processing apparatus can communicate with the USB host apparatus through the USB device controller,
    a use status determination unit for determining a use status of said USB device controller and said USB host controller; and a warning unit for giving a warning to an operator of said information processing apparatus, if said use status determination unit determines that said USB device controller of said USB host controller is in use, and said controller, which is selected from said USB device controller and USB controller in correspondence with the type of the connected apparatus determined by said switching unit and is connected with the connected apparatus, is in use, wherein said switching unit does not select said USB device controller and USB host controller in use as said USB device controller and USB host controller connected with the connected apparatus.

2. The information processing apparatus according to claim 1,
    wherein said connectors are AB type connectors in conformity with the Universal Serial Bus communication standards, and
    wherein if a B type connector is connected with said connection unit, said switching unit determines that the apparatus connected to that connector is the USB host apparatus.

3. The information processing apparatus according to claim 1,
    wherein said connectors are AB type connectors in conformity with the Universal Serial Bus communication standards, and
    wherein if an A type connector is connected with said connection unit, said switching unit determines that the apparatus connected to that connector is the USB device apparatus.

4. The information processing apparatus according to claim 1, wherein if said use status determination unit determines that said USB device controller and USB host controller that were previously in use have come to be not in use, said switching unit selects said USB device controller and USB host controller that have been in use as said USB device controller and USB host controller connected with the connected apparatus.

5. A control method for an information processing apparatus capable of communication with apparatuses connected thereto for information processing, wherein the information processing apparatus comprises
    a USB device controller connectable with a USB host apparatus, which always assumes a host role, for controlling communication between the connected USB host apparatus and the information processing apparatus,
    a USB host controller connectable with a USB device apparatus, which is different from the USB host apparatus, for controlling communication between the connected USB device apparatus and the information processing apparatus,
    a connection unit having a plurality of connectors, wherein each connector is for connecting the USB host apparatus and the USB device apparatus, and
    a controller connected with each of a plurality of apparatuses through the USB device controller or the USB host controller, said method comprising:
    a switching step for switching a connection between each of the connectors and one of the USB device controller and the USB host controller, for determining the type of the apparatus connected to the connector for each connector, and
        if it is determined that the apparatus connected to that connector is the USB device apparatus, for connecting the USB device apparatus with the USB host controller so that the information processing apparatus can communicate with the USB device apparatus through the USB host controller, and
        if it is determined that the apparatus connected to that connector is the USB host apparatus, for connecting the USB host apparatus with the USB device controller so that the information processing apparatus can communicate with the USB host apparatus through the USB device controller;
    a device control step for controlling, by means of the USB device controller, communication between the USB host apparatus and the information processing apparatus; and
    a host control step for controlling, by means of the USB host controller, communication between the USB device apparatus and the information processing apparatus,
    an execution status determination step for determining an execution status of said device control step and said host control step; and a warning step for giving a warning to an operator of the information processing apparatus, if it is determined in said execution status determination step that said device control step or said host control step is in execution, and the controller, which is selected in said switching step in correspondence with the type of the connected apparatus determined in said switching step and controls communication between the connected apparatus and the information processing apparatus, is such a controller that corresponds to the control step in execution, wherein in said switching step, the controller corresponding to said control step that is in execution is not selected as the controller for controlling communication between the connected apparatus and the information processing apparatus.

6. The control method according to claim 5, wherein the connectors are AB type connectors in conformity with the Universal Serial Bus communication standards, and wherein, if a B type connector is connected with the connection unit, it is determined in said switching step that the apparatus connected to that connector is the USB host apparatus.

7. The control method according to claim 5, wherein the connectors are AB type connectors in conformity with the Universal Serial Bus communication standards, and wherein, if an A type connector is connected with the connection unit, it is determined in said switching step that the apparatus connected to that connector is the USB device apparatus.

8. The control method according to claim 5, wherein, if it is determined in said use status determination step that said control step in execution is no longer in execution, the USB device controller or the USB host controller, respectively, corresponding to said control step that has been in execution is selected in said switching step as the controller for controlling communication between the external apparatus and the information processing apparatus.

9. A computer-readable storage medium storing, in executable form, a control program for information processing apparatus for executing by means of a computer the control method according to claim 5.

* * * * *